(12) United States Patent
Kitano

(10) Patent No.: US 8,019,530 B2
(45) Date of Patent: Sep. 13, 2011

(54) JUDGING METHOD OF LOAD DISTRIBUTION

(75) Inventor: Masashi Kitano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1738 days.

(21) Appl. No.: 11/210,799

(22) Filed: Aug. 25, 2005

(65) Prior Publication Data

US 2006/0064238 A1 Mar. 23, 2006

(30) Foreign Application Priority Data

Sep. 17, 2004 (JP) ................................ 2004-271942

(51) Int. Cl.
*G06F 19/00* (2011.01)

(52) U.S. Cl. .............................. 701/124; 701/1; 701/48

(58) Field of Classification Search .................. 701/124, 701/1, 29, 32, 33, 34, 36, 37, 39, 200, 214; 340/5.71, 438, 443, 825.72, 735, 444; 345/156; 250/221; 180/197; 455/420; 307/9.1; 702/183; 706/15

See application file for complete search history.

(56) References Cited

U.S. PATENT DOCUMENTS

| | | | | |
|---|---|---|---|---|
| 4,699,436 A * | 10/1987 | Klein | ......................... | 303/114.1 |
| 4,824,186 A * | 4/1989 | Leiber et al. | ............... | 303/114.2 |
| 5,694,321 A * | 12/1997 | Eckert et al. | .................... | 701/91 |
| 5,710,704 A * | 1/1998 | Graber | ............................ | 701/82 |
| 5,710,705 A * | 1/1998 | Eckert | .............................. | 701/83 |
| 5,711,024 A * | 1/1998 | Wanke | ............................. | 701/82 |
| 5,793,285 A * | 8/1998 | Wehinger | ....................... | 340/443 |
| 6,208,920 B1 * | 3/2001 | Izawa et al. | ...................... | 701/36 |
| 6,434,457 B2 * | 8/2002 | Okita et al. | ...................... | 701/34 |
| 7,103,460 B1 * | 9/2006 | Breed | ............................. | 701/29 |
| 7,164,117 B2 * | 1/2007 | Breed et al. | ................... | 250/221 |
| 7,233,237 B2 * | 6/2007 | Dufournier | ................... | 340/444 |
| 7,313,467 B2 * | 12/2007 | Breed et al. | ........................ | 701/1 |
| 7,379,800 B2 * | 5/2008 | Breed | ............................ | 701/29 |
| 7,421,321 B2 * | 9/2008 | Breed et al. | ..................... | 701/29 |
| 2003/0192375 A1 * | 10/2003 | Sugai et al. | ...................... | 73/146 |
| 2006/0025897 A1 * | 2/2006 | Shostak et al. | .................... | 701/1 |

(Continued)

FOREIGN PATENT DOCUMENTS

EP 0 968 892 A1 1/2000

(Continued)

OTHER PUBLICATIONS

Tire Technical Services, Inc., Reoprt on Comparative Perofrmance of Nail Hole Detection Equipment, 1998, Internet, p. 1-11.*

*Primary Examiner* — John Nguyen
*Assistant Examiner* — Kyung Kim
(74) *Attorney, Agent, or Firm* — Birch, Stewart, Kolasch & Birch, LLP

(57) ABSTRACT

A method of judging the load distribution of a vehicle without providing a specific load sensor on a vehicle is characterized in that the load distribution by the every wheel of a vehicle or the load distribution by every axle is judged by comparing the result of comparing the calculation value of the rotational speeds of wheels in the predetermined two combinations of wheels with the result of comparing the calculation value of the rotational speeds of wheels in the fore-mentioned predetermined two combinations of wheels at a predetermined load when the vehicle is under brakeage.

5 Claims, 7 Drawing Sheets

U.S. PATENT DOCUMENTS

| | | | |
|---|---|---|---|
| 2006/0064238 A1* | 3/2006 | Kitano | 701/124 |
| 2008/0086240 A1* | 4/2008 | Breed | 701/1 |
| 2008/0129475 A1* | 6/2008 | Breed et al. | 340/438 |

FOREIGN PATENT DOCUMENTS

| | | |
|---|---|---|
| JP | 63-305011 A | 12/1988 |
| JP | 9-2222 A | 1/1997 |
| JP | 9-196791 A | 7/1997 |
| JP | 10-115578 A | 5/1998 |
| JP | 11-23425 A | 1/1999 |
| JP | 11-189136 A | 7/1999 |
| JP | 2003-306093 A | 10/2003 |
| KR | 2003-0076709 A | 9/2003 |
| WO | WO-02/068226 A1 | 9/2002 |
| WO | WO-03/016115 A1 | 2/2003 |

* cited by examiner

JUDGING METHOD OF LOAD DISTRIBUTION

BACKGROUND OF THE INVENTION

The present invention relates to a method for judging load distribution by the every wheel of a vehicle or the load distribution by every axle and a device thereof, and a judgment program of the load distribution of a vehicle.

When the pressures of tires mounted on a vehicle are decreased, a fuel mileage is deteriorated and there is danger of provoking burst at high speed running. When a tire is deflated, the decrease in pressure is detected through utilizing the change of properties of tires such as the decrease of the dynamic load radii of tires and the change of resonance frequency.

For example, a conventional detecting device for the decreased tire pressure uses a principle that since the outer diameter of a tire (the dynamic load radius of a tire) is reduced more than that of a tire having normal inner pressure when the pressure of a specific tire of a vehicle is reduced, rotational angular velocity is increased as compared with other normal tires. For example, a method for detecting the decrease in inner pressure from the relative difference of the rotational angular velocities of tires uses a value obtained from following formula as a judging value;

$$DEL = \{(F1+F4)/2 - (F2+F3)/2\}/\{(F1+F2+F3+F4)/4\} \times 100(\%)$$

(Japanese Unexamined Patent Publication No. 305011/1988). Herein, F1 to F4 are the rotational angular velocities of a front left tire, a front right tire, a rear left tire and a rear right tire, respectively.

However, since the fore-mentioned properties of tires are changed by the change of loads such as the number of passengers on board and the weight of a load, the change of a load is judged as the change of tire pressures in the case the change of a load cannot be distinguished from the change of tire pressures; therefore the decrease in pressure cannot be accurately judged.

When all of tire pressures are normal, the fore-mentioned judging value DEL is zero, but when deflation is generated for a wheel, the judging value is changed in accordance with the level of a dynamic load radius. When the decrease in pressure at which an alarm is to be issued to a driver is 30% deflation relative to the normal pressure, the judging value at 30% deflation is referred to as a threshold, and the alarm is issued when the judging value exceeds the threshold. However, the larger the load is, the smaller the decreased level of the dynamic load radius at deflation is; therefore the judging value at 30% deflation in the case of one person boarding is larger than the judging value at 30% deflation in the case of 5 persons boarding.

For example, the judging value at 30% deflation is to be 0.3 in the case of one person boarding and 0.25 in the case of 5 persons boarding. In this case, when an alarm is designed to be issued at 30% deflation in the case of 5 persons boarding, the threshold must be 0.25. However, when the threshold is 0.25, an alarm is issued at 25% deflation in the case of one person boarding (30×0.25÷0.3=25).

There are inventions described in Japanese Unexamined Patent Publication No. 23425/1999, Japanese Unexamined Patent Publication No. 189136/1999 and Japanese Unexamined Patent Publication No. 306093/2003 as a device for judging the load distribution. In Japanese Unexamined Patent Publication No. 23425/1999, a means of detecting resonance level is required. In Japanese Unexamined Patent Publication No. 189136/1999, a means of detecting brakeage force and a means of calculating the gradient μ of road surface are required. In Japanese Unexamined Patent Publication No. 306093/2003, a means of detecting acceleration and deceleration is required.

It is described in Japanese Unexamined Patent Publication No. 196791/1997 and Japanese Unexamined Patent Publication No. 115578/1998 that the information of the load distribution is utilized for detecting the decreased tire pressure. In Japanese Unexamined Patent Publication No. 196791/1997, a load is detected by using a suspension stroke sensor. In Japanese Unexamined Patent Publication No. 115578/1998, a load is detected by judging the change of resonance frequencies before and after opening or closing a door, a trunk or a fill opening as the change of a load, or using a suspension stroke sensor.

Further, it is described in Japanese Unexamined Patent Publication No. 2222/1997 that a ratio of the rotational speed of front wheels to the rotational speed of rear wheels is changed at brakeage and at no brakeage, but relation between the ratio of the rotational speed of front wheels to the rotational speed of rear wheels under brakeage and the load of a vehicle is not described.

SUMMARY OF THE INVENTION

Since properties for judging tire pressures are changed by a load as describe above, measures such as changing the threshold in accordance with the change of a load and the like are required for accurately judging the decrease in pressure. A suspension stroke sensor has been conventionally required specifically for measuring a load. However, the suspension stroke sensor is not generally equipped.

It is the purpose of the present invention to provide a method of judging the load distribution of a vehicle without providing a specific load sensor on a vehicle.

Further, it is the purpose of the present invention to provide a detection method for the decreased tire pressure, wherein a threshold is provided by every load and an accurate deflation alarm can be issued in accordance with the load, using the fore-mentioned judging value of load distribution.

The method for judging the load distribution of a vehicle of the present invention is characterized in that the load distribution by the every wheel of a vehicle or the load distribution by every axle is judged by comparing the result of comparing the rotational speeds of 2 wheels among the fore-mentioned wheels with the result of comparing the rotational speeds of 2 wheels at a predetermined load when the vehicle is under brakeage, using a judgment flag which judges the rotational speeds of wheels mounted on a vehicle and whether the vehicle is under brakeage or not.

The "rotational speeds of 2 wheels" in the present invention means (1) the respective rotational speeds of 2 wheels among all wheels of a vehicle, (2) the average value of the respective rotational speeds of at least 2 wheels among all wheels and the average value of the respective rotational speeds of at least 2 remaining wheels, or (3) the rotational speed of one wheel among all wheels and the average value of the respective rotational speeds of at least 2 remaining wheels.

The judging device for the load distribution of a vehicle of the present invention has a means of detecting the rotational speeds of wheels mounted on the vehicle, a means of detecting whether the vehicle is under brakeage or not, a calculation means of comparing the rotational speeds of 2 wheels among the fore-mentioned wheels when the vehicle is under brakeage, and a means of memorizing the rotational speeds of said 2 wheels at a predetermined load, and is characterized in that the load distribution by the every wheel of the vehicle or the load distribution by every axle is judged by comparing the comparison result of the calculation means with the rotational speeds of 2 wheels at the fore-mentioned predetermined load which is memorized.

Furthermore, the judgment program of the load distribution of a vehicle is characterized in functionalizing a computer as a means of detecting the rotational speeds of wheels mounted on the vehicle, a means of judging whether the vehicle is under brakeage or not, a calculation means of comparing the rotational speeds of 2 wheels among the fore-mentioned wheels when the vehicle is under brakeage, a means of memorizing the rotational speeds of said 2 wheels at a predetermined load or its comparison result, and a means of judging the load distribution by the every wheel of the vehicle or the load distribution by every axle by comparing the comparison result of the fore-mentioned calculation means with the rotational speeds of 2 wheels at the fore-mentioned predetermined load which is memorized, or its comparison result, in order to judge the load distribution of a vehicle.

As the rotational speeds of 2 wheels among wheels, the rotational speeds of 2 wheels can be the average of the rotational speeds of 2 front wheels and the average of the rotational speeds of 2 rear wheels of the vehicle, the average of the rotational speeds of 2 left wheels and the average of the rotational speeds of 2 right wheels of the vehicle, the rotational speeds of the front wheel and the rear wheel of 2 left wheels of the vehicle, the rotational speeds of the front wheel and the rear wheel of 2 right wheels of the vehicle, the average of the rotational speeds of the front wheel and the 2 rear wheels of the vehicle with 3 wheels in which one wheel is a front wheel, and the average of the rotational speeds of the 2 front wheels and the rear wheel of the vehicle with 3 wheels in which one wheel is a rear wheel.

In the case of a vehicle with 6 wheels, the fore-mentioned rotational speeds of 2 wheels can be the average of the rotational speeds of the most front 2 wheels and the average of the rotational speeds of the 4 rear wheels, the average of the rotational speeds of the last 2 wheels and the average of the rotational speeds of the 4 front wheels, the average of the rotational speeds of the 3 left wheels and the average of the rotational speeds of the 3 right wheels, the average of the rotational speeds of the most front 2 wheels and the average of the rotational speeds of the last rear 2 wheels, the average of the rotational speeds of the most front 2 wheels and the average of the rotational speeds of the 2 wheels of a central driving axle, or the average of the rotational speeds of the last rear 2 wheels and the average of the rotational speeds of the 2 wheels of a central driving axle.

In the present invention, the rotational speed of a wheel is a product of the rotational angular speeds of the wheel with a given tire radius. Further, the load distribution of a vehicle means the magnitude correlation of loads applied on arbitrary two pairs of wheels which do not include common wheels in a vehicle. For example, it means the magnitude correlation of loads applied on every wheel of a vehicle, or the magnitude correlation of loads applied on every axle.

The judging method of the load distribution of a vehicle of the present invention can carry out the comparison of the fore-mentioned rotational speeds of 2 wheels by a value obtained by dividing the difference between the rotational speed of the left front wheel and the rotational speed of the left rear wheel by said rotational speed of the left rear wheel.

The comparison of the fore-mentioned rotational speeds of 2 wheels may be carried out by a value obtained by dividing the difference between the rotational speed of the right front wheel and the rotational speed of the right rear wheel by said rotational speed of the right rear wheel.

Furthermore, the comparison of the fore-mentioned rotational speeds of 2 wheels may be carried out by a value obtained by dividing the difference between the rotational speeds of the two front wheels and the rotational speeds of the two rear wheels by said rotational speeds of the two rear wheels.

The detection method of the decreased tire pressure related to the present invention is characterized in that a threshold of detecting the decreased tire pressure is changed in accordance with the judgment result of the load distribution, using the judging method of the load distribution of a vehicle. Further, as the judging method of the load distribution of the vehicle for changing a threshold of detecting the decreased tire pressure, the load distribution by the every wheel of a vehicle or the load distribution by every axle can be judged by comparing the result of comparing the rotational speeds of 2 wheels among the fore-mentioned wheels with the result of comparing the rotational speeds of 2 wheels at a predetermined load when the vehicle is under brakeage, using a judgment flag which judges the rotational speeds of wheels mounted on a vehicle and whether the vehicle is under brakeage or not.

Further, the detecting device for the decreased tire pressure related to the present invention is characterized in that a threshold of detecting the decreased tire pressure is changed in accordance with the judgment result of the load distribution, using the judging method of the load distribution of a vehicle. Further, as the judging method of the load distribution of the vehicle for changing a threshold of detecting the decreased tire pressure, the load distribution by the every wheel of a vehicle or the load distribution by every axle can be judged by comparing the result of comparing the rotational speeds of 2 wheels among the fore-mentioned wheels with the result of comparing the rotational speeds of 2 wheels at a predetermined load when the vehicle is under brakeage, using a judgment flag which judges the rotational speeds of wheels mounted on a vehicle and whether the vehicle is under brakeage or not.

The judging method of the load distribution of a vehicle of the present invention judges the load distribution of a vehicle by detecting that the vehicle is under brakeage, comparing the rotational speeds of wheels (for example, the average of the rotational speeds of 2 front wheels and the average of the rotational speeds of 2 rear wheels) in 2 wheels (for example, 2 front wheels and 2 rear wheels among 4 wheels) among 4 wheels mounted on a vehicle in the case of under brakeage (for example, the average of the rotational speeds of 2 front wheels/the average of the rotational speeds of 2 rear wheels−1), and comparing said comparison value with the comparison value of calculation value in the combination of the same wheels (2 front wheels and 2 rear wheels) which was calculated at a fixed load (for example, the loads of one person boarding and 5 persons boarding in said vehicle). For example, the judging value of the load distribution during running is obtained by interpolation technique from a comparison value in running based on the comparison value of one person boarding and the comparison value of 5 persons boarding. With respect to the example shown in Embodiment 1 described later, it can be judged that although the load distribution ratios to front and rear are the same, the load distributions to left and right are different in the case of 5 persons boarding and in the case that a driver and loads (a weight of 60 kg) were placed at a right rear seat and the right side of a trunk in a small-size vehicle (TOYOTA COROLLA), utilizing the comparison values of the rotational speed of left front wheel/the rotational speed of left rear wheel−1, the rotational speed of right front wheel/the rotational speed of right rear wheel−1, and the average rotational speeds of 2 front wheels/the average rotational speeds of 2 rear wheels−1.

Examples of the load distribution capable of being judged include the load distribution of 2 front wheels and 2 rear wheels, the load distribution of 2 left wheels and 2 right wheels, the load distribution of a front wheel and a rear wheel of 2 left wheels, the load distribution of a front wheel and a rear wheel of 2 right wheels, the load distribution of a left wheel and a right wheel of front wheels, or the load distribution of a left wheel and a right wheel of rear wheels.

Further, it is detected whether a brake is operated or not, in order to detect the vehicle is under brakeage. For example, since brakeage lamps (so-called brake lamps) are linked with the operation of brakes, it is possible only to input the ON/OFF signals of brake lamps by branching, for detecting whether the brake is operated or not.

Further, even if a load is changed, the decreased tire pressure can be accurately detected by changing the threshold of detecting the decreased tire pressure in accordance with the load distribution being judged. With respect to the example shown in Embodiment 2 described later, both of one person boarding and 5 persons boarding can be judged as deflation in state in which one wheel is at 30% deflation, without judging both of one person boarding and 5 persons boarding as deflation in state in which one wheel is at 25% deflation in a regular vehicle (NISSAN CEDRIC), by setting the threshold of tire deflation (the threshold of one person boarding is 0.3 and the threshold of 5 persons boarding is 0.25) in accordance with the judging value of the load distribution, using the result of judging the load distribution by the rotational speed ratio of front wheels to rear wheels under brakeage. As a result, the danger of tire deflation can be notified to a driver without error under the same judgment condition of deflation even though the load distribution state is different.

According to the present invention, optimum control in accordance with the load distribution can be carried out by using the information of the load distribution which was judged as mentioned above for an ABS (antilock brake system) system and a TRC (traction control) system.

For example, in the ABS system, the load distribution is inputted from the judging device for the load distribution of the present invention and the distribution of the brake operating power of respective wheels can be set in accordance with the load distribution. In the ABS system, slipping (tire locking) is momentarily detected and brake operating power is adjusted in real time, but the maximum brake power just before respective wheels are locked can be obtained by setting the brake operating power by every wheel in accordance with the load distribution; therefore safe and reliable braking can be realized. As a result, even though the load distribution differs, a car body is not inclined toward heading direction under brakeage and a driver can operate a brake in state in which direction control is possible.

In the TRC system, the load distribution is inputted from the judging device for the load distribution of the present invention, and the more effective drive control of a vehicle can be realized, for example, by adjusting the drive power distribution of left and right wheels and setting the upper limit of drive power in accordance with the load distribution to suppressing slip at start and acceleration.

According to the judging method of the load distribution of the present invention, the judgment of the load distribution of a vehicle can be carried out only by adding the ON/OFF information of brakes to the information of wheel speeds which are necessary in minimum for the tire deflation warning system, without using a specific suspension stroke sensor.

Furthermore, the alarm for the decreased tire pressure can be issued at a predetermined objective deflation amount even if a load is changed.

DETAILED DESCRIPTION

Figure 1:
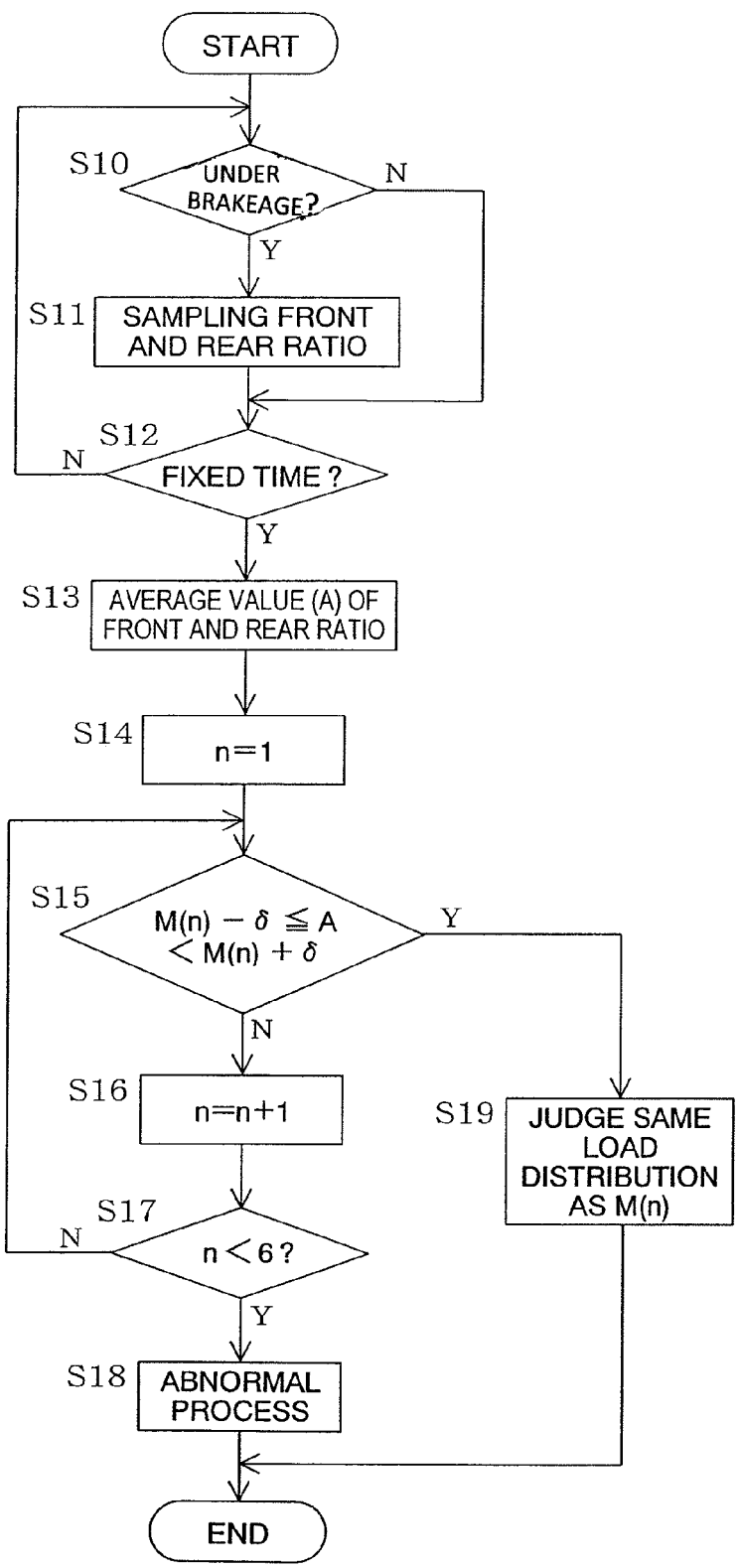
FIG. 1 is a flow chart showing one example of the judging method of the load distribution related to Embodiment 1 of the present invention.

The speeds of 2 wheels among wheels mounted on a vehicle are compared (in the case of a vehicle with 4 wheels, 2 wheels among 4 wheels may be compared and two average values of 2 wheels among 4 wheels may be compared).

Two states in which only loading states are different are considered with respect to a vehicle.

When the magnitude correlation of the speeds of 2 corresponding wheels under brakeage in state A is represented by F1=F2×1.0020 and the magnitude correlation of the speeds of 2 corresponding wheels under brakeage in state B is represented by F1=F2×1.0025 (F1 means the rotational speed of the wheel 1 and F2 means the rotational speed of the wheel 2), the wheel 1 in the state B is faster than in the state A in relative comparison with the wheel 2.

At this time, it is judged that a load to the wheel 1 in the state B is larger than that in the state A, or a load to the wheel 2 is smaller.

Further, when the magnitude correlation of the rotational speeds of 2 corresponding wheels under brakeage in state C is represented by F1=F2×1.0050, it is judged that a load to the wheel 1 in the state C is twice as large as the change from the state A to the state B compared with the state A, or a load to the wheel 2 is twice as small as the change from the state A to the state B.

The calculation value of the rotational speeds of said wheels in 2 predetermined combinations of wheels can be the average of the rotational speeds of 2 front wheels and the average of the rotational speeds of 2 rear wheels, the average of the rotational speeds of 2 left wheels and the average of the rotational speeds of 2 right wheels, the rotational speeds of the front wheel and the rear wheel of 2 left wheels, the rotational speeds of the front wheel and the rear wheel of 2 right wheels, the rotational speeds of the left wheel and right wheel of 2 front wheels, or the rotational speeds of the left wheel and right wheels of 2 rear wheels.

Further, in the case of a vehicle with 3 wheels (for example, the front wheel is one wheel), the calculation value of the rotational speeds of said wheels in 2 predetermined combinations of wheels can be the average of the rotational speeds of the front wheel and the 2 rear wheels, and the rotational speeds of the left wheel and right wheel of 2 rear wheels.

The relative change of the loading state of a vehicle can be judged, and the change of the loading state can be detected (for example, when the mounted state equal in left and right is memorized in comparison of the rotational speeds of left and right 2 wheels, biased loading to a left and right direction can be detected) from the condition when a specific state is memorized (for example, one person boarding).

Examples of the load distribution capable of being judged include the load distribution of 2 front wheels and 2 rear wheels, the load distribution of 2 left wheels and 2 right wheels, the load distribution of a front wheel and a rear wheel of 2 left wheels, the load distribution of a front wheel and a rear wheel of 2 right wheels, the load distribution of a left wheel and a right wheel of front wheels, or the load distribution of a left wheel and a right wheel of rear wheels.

The present invention utilizes that the ratio of a front wheel to a rear wheel under brakeage is different for one person boarding and 5 persons boarding and the different level is changed depending on the total weight of loads such as the number of passengers on board.

The rotational speeds of wheels are represented as follow in the illustration below.

$W_{**}$: the rotational speed of a wheel
** Represents the position of the wheel (FL: front left, FR: front right, RL: rear left and RR: rear right).

For example, the rotational speed of the front left wheel is $W_{FL}$.

Embodiment 1

Then, the method of the present invention was applied to TOYOTA COROLLA (FF vehicle: 5 persons boarding) and an example of comparison in real situations will now be illustrated. Further, the average rotational speed of 2 front wheels and the average rotational speed of 2 rear wheels were used for two rotational speeds of wheels to be compared.

Figure 2:
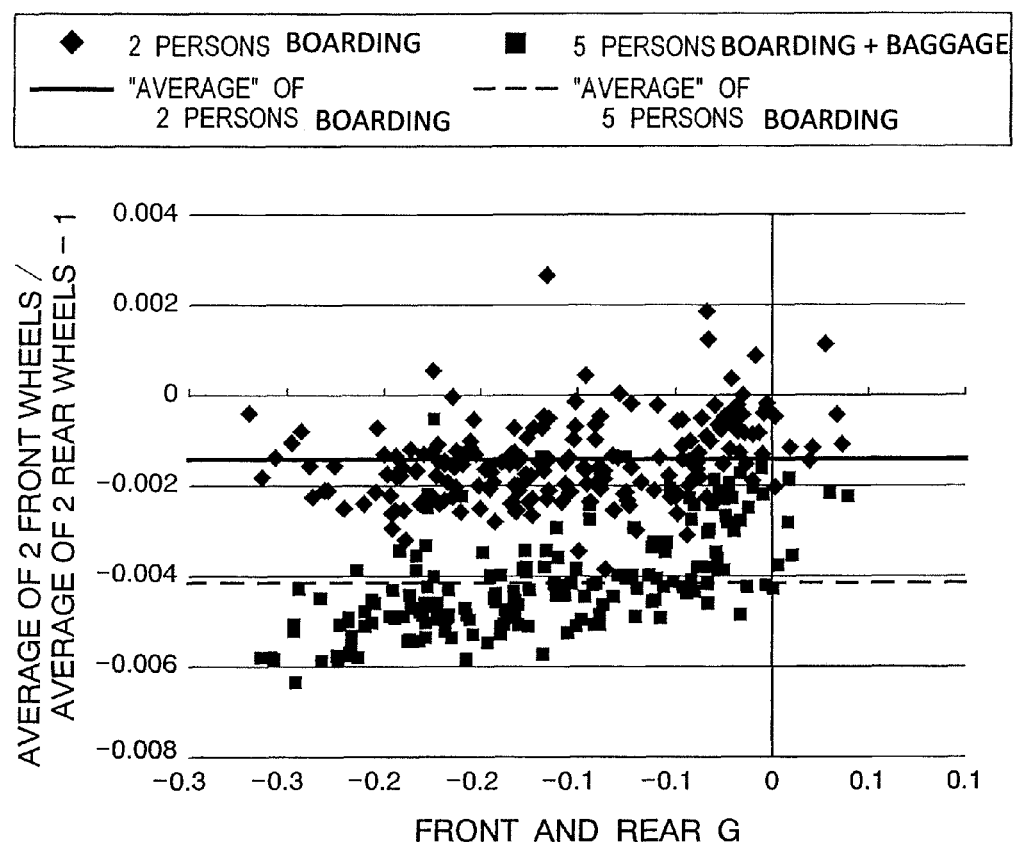
FIG. 2 is a graph showing the change of calculation value for the judgment of the load distribution in the cases of 2 persons boarding and 5 persons boarding related to Embodiment 1 of the present invention.

FIG. 2 is a graph in which the value of $((W_{FL}+W_{FR})/2)/((W_{RL}+W_{RR})/2)-1$, namely [the average rotational speed of 2 front wheels/the average rotational speed of 2 rear wheels−1] was plotted relative to front and rear acceleration (unit is gravity acceleration. Hereinafter, referred to as front and rear G). Measurement was carried out in a state in which 2 persons (a driver and an assistant) boarded on front seats and in a state in which a weight of 60 kg was placed in a baggage chamber in addition to regular number boarding under brakeage, to obtain data. The route by which data were measured was a reciprocal route of about 30 km in a zone from Rokko Island to Naruohama beach via the gulf coast line of Hanshin High Way, and a time required was about 40 minutes.

The comparison value (the average of 2 front wheels/the average of 2 rear wheels−1) used is a positive value in the case of the rotational speeds of front wheels>the rotational speeds of rear wheels and a negative value in the case of the rotational speeds of front wheels<the rotational speeds of rear wheels. Further, the magnitude of its absolute value is proportional to a level by which a faster wheel speed is faster than speed of the other wheel speed. In the case of Comparative Example, the front wheels being driving wheels have larger brake force under brakeage and are slightly slipped against a rotational direction; therefore the 2 rear wheels rotate faster than the 2 front wheels. It can be said that difference is larger in the state of 5 persons boarding+a baggage in comparison with a state of 2 persons boarding.

The magnitude of the absolute value of the comparison value (the average of 2 front wheels/the average of 2 rear wheels−1) used is proportional to a level by which the faster wheel speed is faster than other speed of the other wheel speed. In the case of Comparative Example, difference is larger in the state of 5 persons boarding+a baggage in comparison with a state of 2 persons boarding Then, measurement were carried out at 8 levels in total (twice at respective levels, 2×8=16 sets in total).
(1) Only a driver
(2) A driver and a passenger on an assistant seat (2 persons boarding in total)
(3) A driver, passengers on an assistant seat and a right rear seat (3 persons boarding in total)
(4) A driver, passengers on an assistant seat, a right rear seat and a left rear seat (4 persons boarding in total)
(5) A driver, passengers on a right rear seat and a left rear seat (3 persons boarding in total)
(6) A driver, passengers on an assistant seat, a right rear seat, a left rear seat and a central rear seat (5 persons boarding in total)
(7) A driver, passengers on an assistant seat, a right rear seat, a left rear seat and a central rear seat (5 persons boarding in total) and the center of a trunk (a weight of 60 kg) (equivalent to the maximum load of the fore-mentioned vehicle (TOYOTA COROLLA))
(8) A driver, loads on a right rear seat and a right trunk (a weight of 60 kg)

Figure 3:
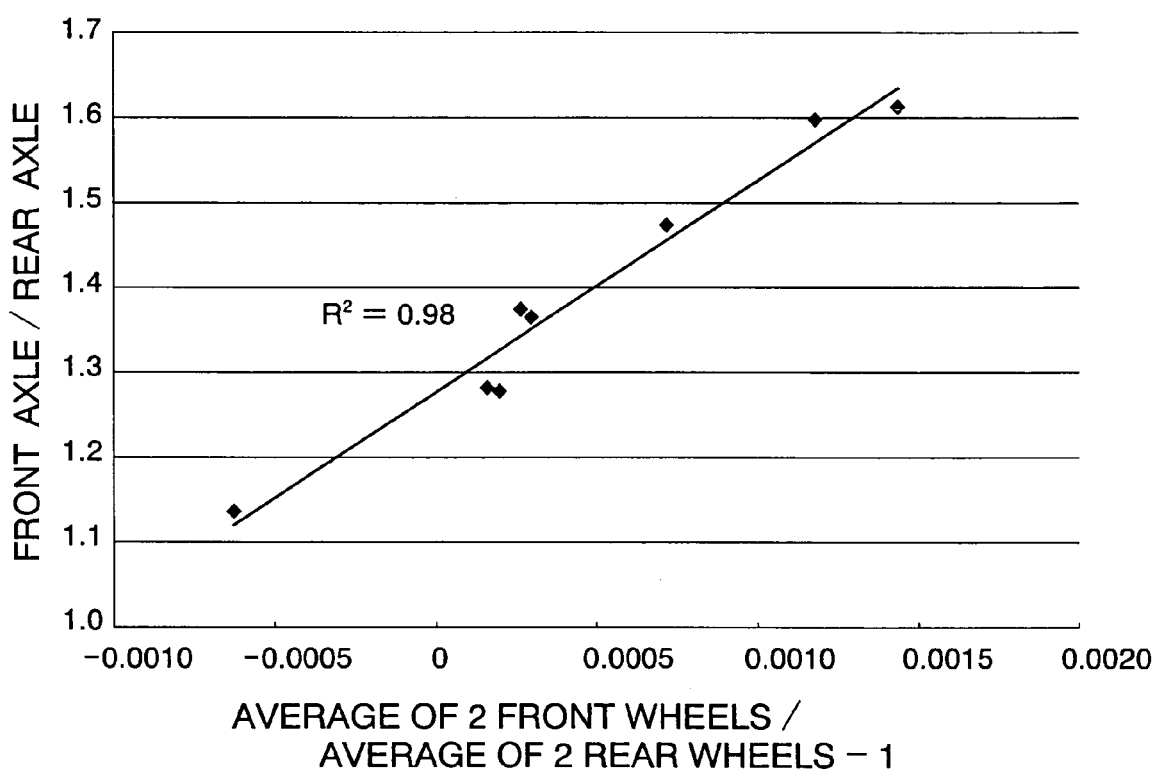
FIG. 3 is a graph showing relation between the calculation value for the judgment of the load distribution in the case of the change of a load and the load distribution of a front axle and a rear axle related to Embodiment 1 of the present invention.

Table 1 is the data of a weight (a weight of a wheel) per a wheel at respective levels and a weight (a weight of an axle) per an axle. FIG. 3 is a graph representing relation between comparison values (the average of 2 front wheels/the average of 2 rear wheels−1) under brakeage and the front and rear load distributions (a weight of a front axle/a weight of a rear axle). The graph means that when the comparison values are changed under brakeage, it can be grasped that the front and rear load distributions were changed. Further, when the comparison values for two conditions in which the front and rear load distributions are different are grasped (if a regression line or relation equivalent to it is grasped), the load distribution can be judged by the relation of a regression line or an interpolation technique from the comparison value during running. Further, the fore-mentioned 8 levels (or a portion of the levels) are set as fixed load conditions, the rotational speeds of wheels under brakeage are measured and the comparison values can be calculated to be set.

TABLE 1

| Level | FL wheel (kg) RL wheel (kg) | FR wheel (kg) RR wheel (kg) | Front axle (kg) Rear axle (kg) | Front wheel ÷ rear wheel | Total weight (kg) |
|---|---|---|---|---|---|
| (1) | 353 229 | 384 228 | 737 457 | 1.61 | 1194 |
| (2) | 376 245 | 394 237 | 770 482 | 1.60 | 1252 |
| (3) | 374 264 | 407 266 | 781 530 | 1.47 | 1311 |
| (4) | 386 294 | 403 284 | 789 578 | 1.37 | 1367 |
| (5) | 362 267 | 398 286 | 760 553 | 1.37 | 1313 |

TABLE 1-continued

| Level | FL wheel (kg) RL wheel (kg) | FR wheel (kg) RR wheel (kg) | Front axle (kg) Rear axle (kg) | Front wheel ÷ rear wheel | Total weight (kg) |
|---|---|---|---|---|---|
| (6) | 394 312 | 411 316 | 805 628 | 1.28 | 1433 |
| (7) | 388 345 | 404 352 | 792 697 | 1.14 | 1489 |
| (8) | 331 263 | 405 313 | 736 576 | 1.28 | 1312 |

Among the fore-mentioned 8 levels, the ratios of the front and rear load distributions for (6) and (8) are 1.28 together, but the left and right load distributions are as Table 2.

TABLE 2

| Level | Total of left wheels (kg) | Total of right wheels (kg) | Left ÷ right |
|---|---|---|---|
| (6) | 706 | 727 | 0.97 |
| (8) | 594 | 718 | 0.83 |

Figure 4:
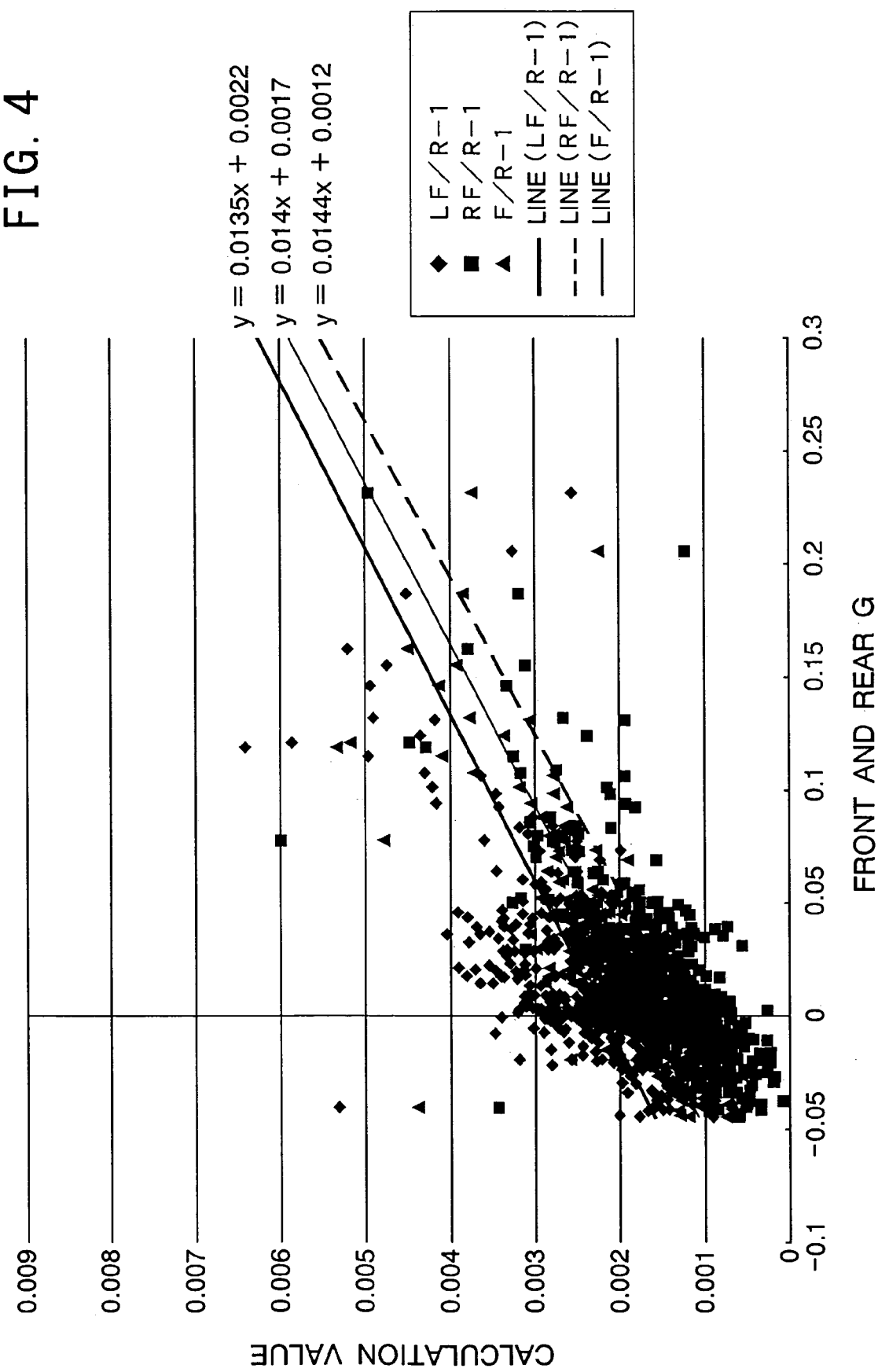
FIG. 4 is a graph representing relation between the calculation value for the judgment of the 3 loads distribution in the case of 5 persons boarding and the front and rear G related to Embodiment 1 of the present invention.
Figure 5:
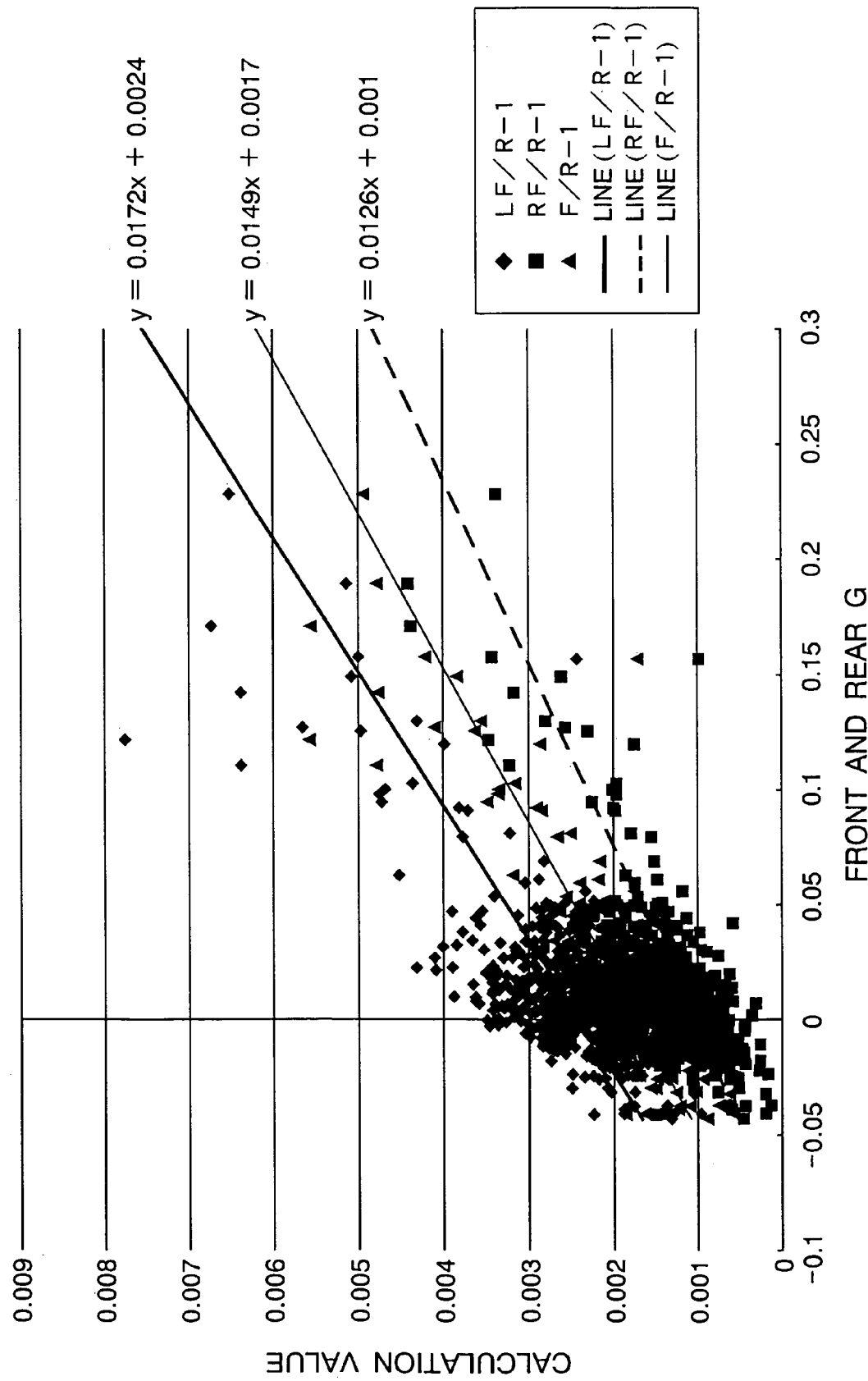
FIG. 5 is a graph representing relation between the calculation value for the judgment of the 3 loads distribution in the case of a load biased to the right side of a vehicle and the front and rear G related to Embodiment 1 of the present invention.

FIGS. 4 and 5 are graphs in which the comparison values of the rotational speeds of wheels according to the combinations of 3 patterns were plotted against the front and rear G in the load distributions of the fore-mentioned (6) (FIG. 4) and (8) (FIG. 5). In FIGS. 4 and 5, LF/R-1 represents the rotational speed of left front wheel/the rotational speed of left rear wheel-1 (namely, $W_{FL}/W_{RL}-1$), RF/R-1 represents the rotational speed of right front wheel/the rotational speed of right rear wheel-1 (namely, $W_{FR}/W_{RR}-1$), and F/R-1 represents the average rotational speed of 2 front wheels/the average rotational speed of 2 rear wheels-1 (namely, $((W_{FL}+W_{FR})/2)/((W_{RL}+W_{RR})/2)-1$).

From FIGS. 4 and 5, the difference between "$W_{FL}/W_{RL}-1$" and "$W_{FR}/W_{RR}-1$" (the difference of respective average values) in the load distributions of the fore-mentioned (6) is 0.004458. On the other hand, the difference between "$W_{FL}/W_{RL}-1$" and "$W_{FR}/W_{RR}-1$" (the difference of respective average values) in the load distributions of the fore-mentioned (8) is −0.0009. Thus, when the difference between "$W_{FL}/W_{RL}-1$" and "$W_{FR}/W_{RR}-1$" is compared, it can be judged that the left and right load distributions were changed. Further, when the difference of the comparison values for the two conditions in which the left and right load distributions are different is grasped (if a regression line or relation equivalent to it is grasped), the left and right load distributions can be specified from the difference of the comparison values.

FIG. 1 is a flow chart showing an example of the judging method of the load distribution of the present invention. Referring FIG. 1, the method of judging the state of the load distribution is illustrated.

The state of loading is not usually changed unless a vehicle is stopped. The getting on and off of a passenger and the loading and unloading of baggage are not carried out unless the vehicle is stopped. Further, the state of a load is changed when a fuel is filled up in a fuel tank from empty state, but when a fuel is fed, it is carried out at the stoppage of the vehicle. Accordingly, although it is not described in the flow chart of FIG. 1, it is judged whether the state of a load is changed or not, before and after detecting that the vehicle was stopped for a fixed time or more. To the contrary, when the vehicle is not stopped, the average processing or linear approximation processing of the comparison values of the rotational speeds of wheels during the time can be carried out, assuming that the state of a load is not changed.

The detection of stoppage of a vehicle can be also carried out by detecting that the rotational speeds of wheels are zero for a fixed time, by switching off an ignition switch or by detecting that an automatic transmission is positioned at a P range for a fixed time.

In Embodiment 1, the average value is calculated by sampling the calculation values of the rotational speeds of wheels for an interval at which the vehicle is not stopped for a fixed time (for example, for 3 minutes), an interval of a fixed time (for example, for 30 minutes) and during that the vehicle is under brakeage. Further, the state of the load distribution assumes 6 patterns. For example, in the case of the fore-mentioned vehicle (TOYOTA COROLLA), 6 patterns of 1 to 5 persons boarding and 5 persons boarding+a baggage of 60 kg can be assumed.

It is judged that the vehicle is under brakeage (Step 10) and when it is under brakeage, the ratio of the rotational speeds of the front and rear wheels $(((W_{FL}+W_{FR})/2)/((W_{RL}+W_{RR})/2)-1)$ (hereinafter, referred to as the front and rear ratio) is sampled (Step 11). Samplings are carried out during a fixed time (assuming that the vehicle is not stopped) and its average A is calculated (Step 13). Although samplings are carried out for a fixed time in the present example (Step 12), the samplings may be carried out until fixed numbers of samplings are obtained.

In order to detect that the vehicle is under brakeage, it is detected whether brakes are operated or not. Since brakeage lamps (so-called brake lamps) are linked with the operation of brakes, the ON/OFF signals of brake lamps are inputted by branching, for detecting whether the brake is operated or not.

The load distribution is judged by comparing the average value A calculated, with the average value M(n) of the front and rear ratios which were already memorized. The average value M(n) of the front and rear ratios in the fixed load distributions is preliminarily measured to be memorized. In the present example, the average value M(1) of the front and rear ratios in the case of one person boarding being the minimum load and the average value M(6) of the front and rear ratios in the case of mounting 5 persons boarding+a baggage of 60 kg which is the maximum load are preliminarily measured to be set, and M(2) to M(5) are a value which was obtained by equally dividing the interval. δ is a value which was obtained by equally dividing the difference between M(6) and M(1) by 10.

The comparison of the average value A of the front and rear ratios with M(n) is judged by whether it is within a range centering M(n) or not. For example, since the present example is 6 patterns, a value which was obtained by equally dividing the difference between M(1) and M(6) by 10 is referred to as δ, and when A is within a range of M(n)±δ (Step 15), it is judged that A is the same load distribution as M(n) (Step 19).

Alternatively, the average value of the front and rear ratios which were preliminarily measured in all of 6 patterns may be set as M(n). In this case, it is judged whether the average value A of the front and rear ratios during running is within a range from (M(n−1)+M(n))/2 to (M(n)+M(n+1))/2. A value equivalent to δ of M(1)−δ or M(6)+δ uses (M(2)−M(1))/2 or (M(6)−M(5))/2.

When the average value A of the front and rear ratios does not correspond to the range of any of the average value M(n) of the front and rear ratios (branching from Step 17 to N), abnormal processing is carried out (Step 18). It is assumed as the abnormal treatment that for example, the simultaneous deflation of 2 front wheels or 2 rear wheels or the simultaneous deflation of 4 wheels is alarmed.

Figure 7:
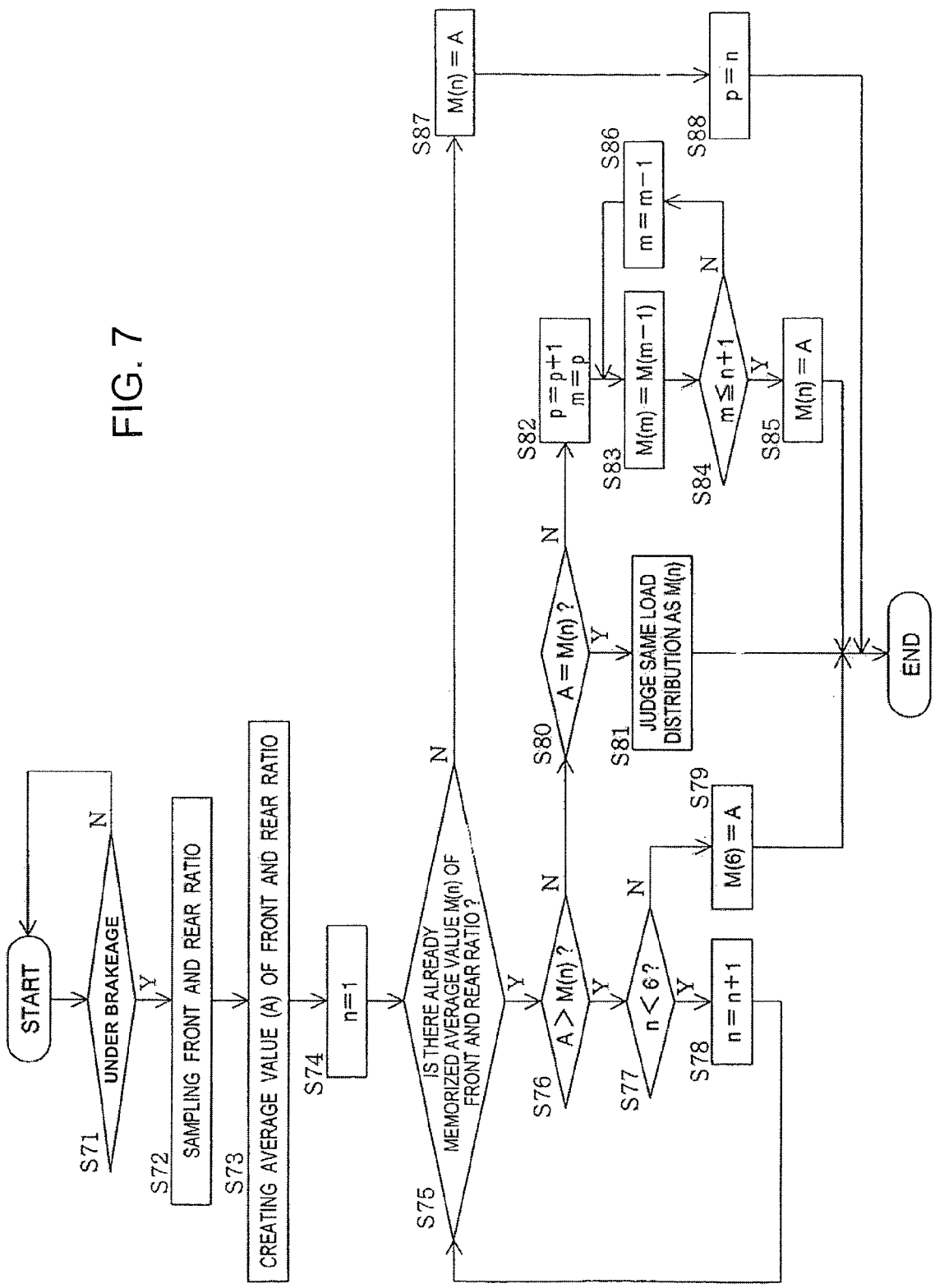
FIG. 7 is a flow chart showing another one example of the judging method of the load distribution related to the present invention.

FIG. 7 is a flow chart showing another one example of the judging method of the load distribution of the present invention. The method of FIG. 7 assumes the state of the load distribution of 6 patterns in like manner as the method of FIG. 1. In the flow chart of FIG. 7, the judgment of the magnitude or equality of the average value A of the front and rear ratios under brakeage to the average value M(n) of the front and rear ratios memorized is judged by the range from (M(n−1)+M(n))/2 to (M(n)+M(n+1))/2 in which M(n) has a certain width in like manner as FIG. 1, but it is abbreviated in FIG. 7. FIG. 7 shows a method of setting the average value M(n) of the front and rear ratios being a base while a vehicle is running. Namely, when the average value A of the front and rear ratios under brakeage is larger than the maximum M(6), M(6) is substituted with A, and when A is smaller than the minimum M(1), M(1) is substituted with A. Thereby, the average value of the front and rear ratios of the maximum load distribution and the minimum mounted load distribution of a vehicle is set while running is repeated.

Thus, the load distribution at that time can be judged by comparing the average value of the front and rear ratios under brakeage with the average value of the front and rear ratios memorized. With respect to the example of FIG. 1 or FIG. 7, it can be judged which of 6 patterns the load distribution corresponds to.

In Embodiment 1, the state of the load distribution was set as 6 patterns, but the number of the pattern is not limited to 6, and may be set as any number considering the sampling number of data and the accuracy of detection. When the sampling number of data is increased and the accuracy is heightened, the pattern can be minutely divided. Further, when it is satisfied by roughly judging the state of the load distribution, patterns are lessened and the state of the load distribution can be rapidly judged.

Embodiment 2

Figure 6:
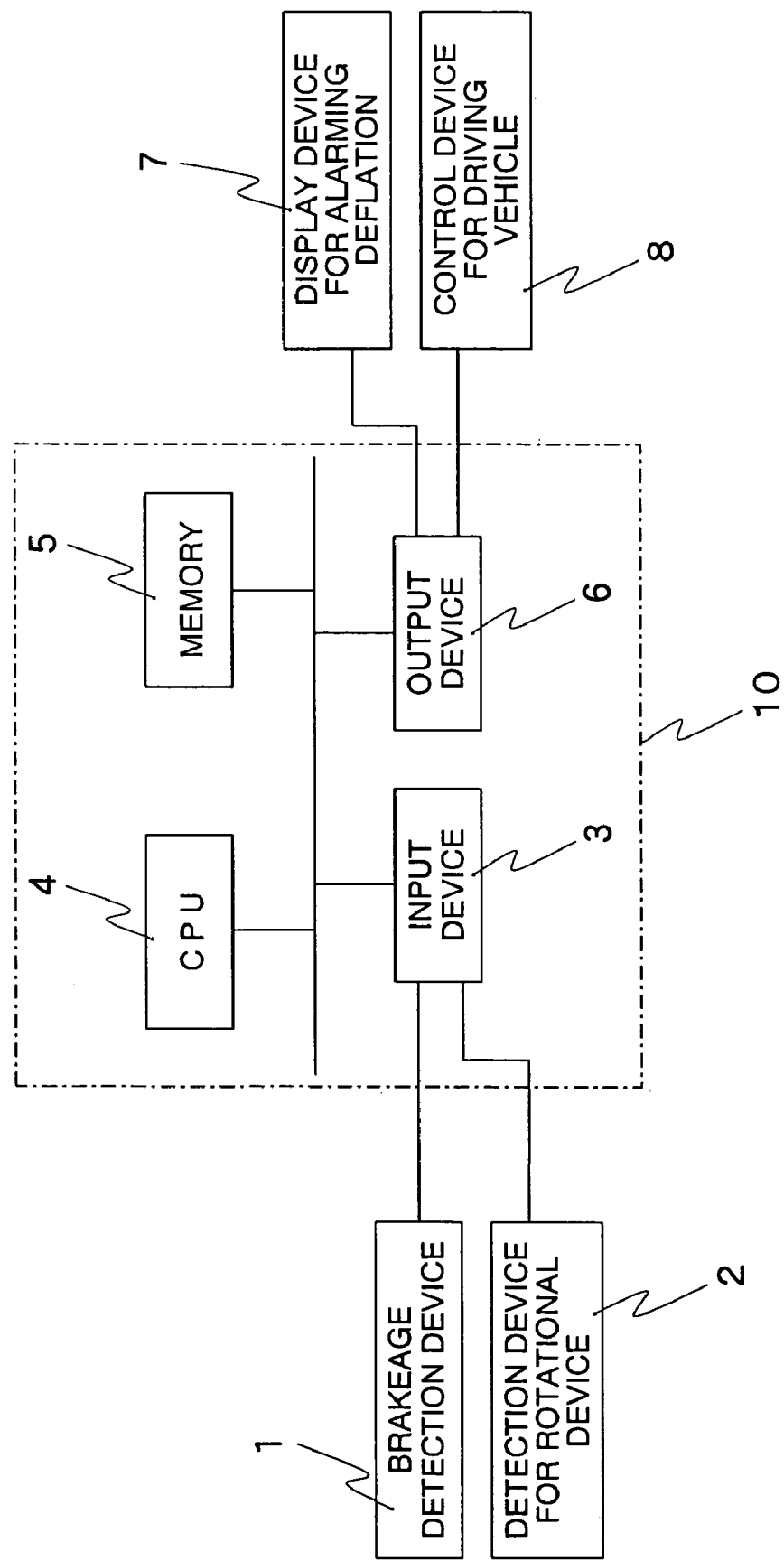
FIG. 6 is a block diagram showing one example of the detecting device for the decreased tire pressure related to Embodiment 2 of the present invention.

FIG. 6 is a block diagram of the detecting device for the decreased tire pressure related to the Embodiment of the present invention. The detecting device 10 of the decreased tire pressure inputs whether a vehicle is under brakeage, through an input device 3 from a detecting device 1 of brakeage and memorizes it in a memory 5. The information of the rotational speeds of wheels from a detecting device 2 of the rotational speeds of wheels is inputted and memorized in the memory 5. The information of the rotational speeds of wheels from a detecting device 2 of the rotational speeds of wheels may be pulses which are generated by rotation of wheels. In that case, the rotational speeds of wheels can be calculated from the cycle of pulses or the number of pulses with a fixed time interval. CPU 4 performs a program stored in a memory 5. In Embodiment 2, one memory 5 is described, however, the program may be divided to be memorized in ROM (read-only memory) and calculation data may be divided to be memorized in RAM (random access memory). Further, a display device 7 of alarming deflation which displays the deflation alarm of the air pressure of tires which was judged and a control device 8 of driving a vehicle utilizing the information of the load distribution and the information of the decreased tire pressure are connected thereto.

The detection of brakeage inputs the ON/OFF signals of brake lamps by branching, in like manner as Embodiment 1.

A load is judged by the judging method of the load distribution illustrated in Embodiment 1 and the threshold of judging the decreased tire pressure in accordance with the load is set. The judging value of the decreased tire pressure is calculated based on the information of the rotational speeds of wheels which was inputted from the detecting device 2 of the rotational speeds of wheels and judges whether the air pressure of tires is reduced or not by exceeding a prescribed range through comparing said judging value with the threshold. When the judging value is the threshold or more and deflation is judged, alarm is displayed by, for example, the lighting of lamps and the sounding of buzzer (the display device 7 for alarming deflation).

Further, the information of the load distribution is outputted to the control device 8 of driving a vehicle (for example, an ABS system and a TRC device) and can be utilized for the control of driving a vehicle. In this case, the detecting device 10 of the decreased tire pressure is also the judging device for the load distribution.

For example, in an ABS system, the load distribution is inputted from the judging device for the load distribution of the present invention, and the distribution of the brake operating force of respective wheels can be set in accordance with the load distribution. The ABS system detects timely the slip (tire lock) of tires and adjusts the brake operating force in real time, but respective wheels can obtain the maximum brake operating force just before locking; therefore safer and reliable breakage can be realized. As a result, even though the load distribution differs, a car body is not inclined toward heading direction under brakeage and a driver can operate a brake in state in which direction control is possible.

In the TRC system, the load distribution is inputted from the judging device for the load distribution of the present invention, and the more effective drive control of a vehicle can be realized, for example, by adjusting the drive power distribution of left and right wheels and setting the upper limit of drive power in accordance with the load distribution to suppressing slip at start and acceleration.

Then, a method of accurately carrying out the judgment of deflation by changing the threshold of the judgment of tire deflation in accordance with the load distribution using the judging value of the load distribution is illustrated according to Example.

Conditions of Example

Vehicle used: NISSAN CEDRIC (Model GH-HY34, June, 2000)

Tires used: Dunlop•b>LM702 215/45ZR17

The judging value of the decreased tire pressure:

$$(((W_{FL}+W_{RR})/2)-((W_{FR}+W_{RL})/2)/(W_{FL}+W_{FR}+W_{RL}+W_{RR})/4) \times 100$$

Wherein $W_{**}$: the rotational speed of a wheel
** Represents the position of the wheel (FL: front left, FR: front right, RL: rear left and RR: rear right).

The body weight of a driver is 72 kg and a weight of 60 kg for each passenger was substituted for passengers.

For the combination of a vehicle and tires in which the judging value is zero at normal inner pressure, and the judging values at 30% deflation are 0.3 for one person boarding and 0.25 for 5 persons boarding, the threshold of deflation judgment in the load distribution of one person boarding was set at 0.3 and the threshold of deflation judgment in the load distribution of 5 persons boarding was set at 0.25, with respect to the threshold of the judging value of deflation.

The judgment of the state of the load distribution was carried out by using the ratio of the rotational speeds of the front and rear wheels $(((W_{FL}+W_{FR})/2)/((W_{RL}+W_{RR})/2)-1)$ in the case of under brakeage, and a similar method as the flow chart of FIG. 1 which is the example of Embodiment 1 was applied after being matched with the maximum load of a vehicle (NISSAN CEDRIC) of Example.

Under the setting, the air pressure of one wheel was reduced by 25% to carry out a running test. The threshold in accordance with a load was selected by the judgment of the load, and no alarm was issue for both one person boarding and 5 persons boarding.

Under the same setting, the air pressure of one wheel was reduced by 30% to carry out a running test. The threshold in accordance with a load was selected by the judgment of the load, and alarm was issued for both one person boarding and 5 persons boarding.

Thus, the detection of the decreased tire pressure can be accurately carried out in accordance with a load by setting the threshold of deflation judgment in accordance with the load distribution. With respect to the example of Embodiment 2, deflation was not judged for both of one person boarding and 5 persons boarding in a state in which one wheel was diffused by 25% in a regular vehicle (NISSAN CEDRIC), but deflation was judged for both of one person boarding and 5 persons boarding in a state in which one wheel was diffused by 30%. Consequently, the danger of tire deflation can be informed to a driver without error under the same judgment condition of deflation even though the load distribution state is different, by setting the threshold of the judgment of tire deflation in accordance with the state of the load distribution, utilizing the result of the judging method of the load distribution of the present invention.

Further, in the fore-mentioned Embodiments 1 and 2, a small-size automobile car (TOYOTA COROLLA) and a regular automobile car (NISSAN CEDRIC) were described as examples, but the judging method of the load distribution of the present invention is not limited to the small-size automobile car and the regular automobile car, and can be applied to vehicles equipped with hollow tires such as a light car, a vehicle with 3 wheels, a minivan, a wagon, a truck and a bus.

Further, in Embodiment, the judgment of the load distribution was illustrated exemplifying the average of the rotational speeds of 2 front wheels and the average of the rotational speeds of 2 rear wheels of a Vehicle with 4 wheels, the rotational speeds of the front wheel and the rear wheel of 2 left wheels, and the rotational speeds of the front wheel and the rear wheel of 2 right wheels, as the rotational speeds of 2 wheels. However, the load distribution of objective two wheels can be judged by comparison of the rotational speeds of other arbitrarily selected two wheels. For example, the left and right load distribution of a vehicle can be judged by comparing the average of the rotational speeds of 2 left wheels with the average of the rotational speeds of 2 right wheels. Further, in the case of a vehicle with 3 wheels in which the front wheel (rear wheel) is one wheel, the front and rear load distribution of a vehicle can be judged by comparing the rotational speed of the front wheel (rear wheel) with the average of the rotational speeds of 2 rear wheels (front wheels).

Further, in the case of a vehicle with 6 wheels in which the rear wheels are 4 wheels, the rotational speeds of 2 wheels can be the average of the rotational speeds of the front 2 wheels and the average of the rotational speeds of the 4 rear wheels, or the average of the rotational speeds of the 3 left wheels and the average of the rotational speeds of the 3 right wheels, and the front and rear load distribution of a vehicle or the left and right load distribution of a vehicle can be judged. Furthermore, in the case of a vehicle with 6 wheels by combination of a tractor for a semi-rig with a semi-rig, the rotational speeds of 2 wheels can be the average of the rotational speeds of 4 wheels for a tractor for a semi-rig and the average of the rotational speeds of 2 wheels for a semi-rig, the average of the rotational speeds of the front 2 wheels for a tractor for a semi-rig and the average of the rotational speeds of 2 wheels for a semi-rig, or the average of the rotational speeds of the rear 2 wheels for a tractor for a semi-rig and the average of the rotational speeds of 2 wheels for a semi-rig. The load distribution weighed on the 2 wheels of the tractor for a semi-rig and the semi-rig, or the load distribution by every axle can be judged.

In the present specification, all combinations cannot be described as the rotational speeds of 2 wheels, but the load distribution of the combination of 2 wheels can be judged by setting the combination of the rotational speeds of 2 wheels imitating the fore-mentioned examples and by applying the method of the present invention.

What is claimed is:

1. A method for judging the distribution of a load supported by wheels mounted on a vehicle based on the rotational speeds of the wheels, wherein the load includes variable loading carried by the vehicle, the method comprising the steps of:
    a) detecting the rotational speeds of the wheels;
    b) detecting whether a brake, or brakes, on the vehicle are being operated or not being operated;
    c) calculating a first value resulting from a comparison of the rotational speeds of two of the wheels with respect to the rotational speeds of others of the wheels when the brake, or brakes, are being operated;
    d) using a computer for comparing the first value with a stored second value resulting from a comparison of the rotational speeds of the two wheels with respect to the rotational speeds of others of the wheels when (1) the brake, or brakes, are being operated and (2) the distribution of the load is in a predetermined load distribution state; and
    e) judging the distribution of the load from the comparison performed in step d.

2. A device for judging the distribution of a load supported by wheels mounted on a vehicle based on the rotational speeds of the wheels wherein the load includes variable loading carried by the vehicle, the device comprising:
    a device for detecting the rotational speeds of the wheels;
    a device for detecting whether a brake, or brakes, on the vehicle are being operated or not being operated; and
    a computer configured for performing functions which include:
    calculating a first value resulting from a comparison of the rotational speeds of two of the wheels with respect to the rotational speeds of others of the wheels when the brake, or brakes, are being operated;
    comparing the first value with a stored second value resulting from a comparison of the rotational speeds of the two wheels with respect to the rotational speeds of others of the wheels when (1) the brake, or brakes, are being operated and (2) the distribution of the load is in a predetermined load distribution state; and
    judging the distribution of the load from the comparison of the first value with the stored second value.

3. A program stored on computer-readable media for judging the distribution of a load supported by wheels mounted on a vehicle based on the rotational speeds of the wheels, wherein the load includes variable loading carried by the vehicle, the program when executed carrying out a method comprising the steps of:
    a) detecting the rotational speeds of the wheels;
    b) detecting whether a brake, or brakes, on the vehicle are being operated or not being operated;

c) calculating a first value resulting from a comparison of the rotational speeds of two of the wheels with respect to the rotational speeds of others of the wheels when the brake, or brakes, are being operated;
d) using a computer for comparing the first value with a stored second value resulting from a comparison of the rotational speeds of the two wheels with respect to the rotational speeds of others of the wheels when (1) the brake, or brakes, are being operated and (2) the distribution of the load is in a predetermined load distribution state; and
e) judging the distribution of the load from the comparison the comparison performed in step d.

4. A method for detecting decreased tire pressure, wherein a threshold for detecting the decreased tire pressure is changed in accordance with the judged distribution of the load, using the method for judging the distribution of the load according to claim 1.

5. A device for detecting decreased tire pressure, wherein a threshold for detecting the decreased tire pressure is changed in accordance with the judged distribution of the load, having means for performing the method for judging the distribution of the load according to claim 1.

* * * * *